May 21, 1963 R. JUFFA ETAL 3,090,223
PROCESS FOR SIMULTANEOUSLY MEASURING CHANGES IN
THE VISCOSITY AND ELASTICITY OF A SUBSTANCE
UNDERGOING A CHEMICAL OR PHYSICAL CHANGE
Filed April 14, 1959
3 Sheets-Sheet 3

INVENTOR
RICHARD JUFFA
WILHELM KALLERT

BY Burgess, Dinklage & Sprung

ATTORNEYS

United States Patent Office 3,090,223
Patented May 21, 1963

3,090,223
PROCESS FOR SIMULTANEOUSLY MEASURING CHANGES IN THE VISCOSITY AND ELASTICITY OF A SUBSTANCE UNDERGOING A CHEMICAL OR PHYSICAL CHANGE
Richard Juffa, Leverkusen, and Wilhelm Kallert, Cologne-Stammheim, Germany, assignors to Farbenfabriken Bayer Aktiengesellschaft, Leverkusen, Germany, a corporation of Germany
Filed Apr. 14, 1959, Ser. No. 806,366
Claims priority, application Germany May 7, 1958
3 Claims. (Cl. 73—59)

In the manufacture of, for example, high molecular weight products, raw materials for lacquers and tar products, there frequently occurs a gradual change in the viscosity of the reaction mass, the rate of change of the viscosity depending on the temperature, the reaction time or on other factors. The change in viscosity is accompanied by a change in the elasticity of the product. There is thus frequently a need for a method of simultaneously measuring the changes in viscosity and elasticity of one and the same substance over the widest possible range. For example, in studies in connection with the manufacture of wood oil-stand oil it is not possible, with the equipment at present in use, to follow by measurement from start to finish the gradual increase in viscosity to the stage of gelatinization or solidification in the rapidly proceeding reaction.

According to the present invention there is now provided apparatus and a process for simultaneously measuring changes in the viscosity and elasticity of a substance undergoing a chemical or physical change. In a preferred embodiment of the invention the reaction torque of an agitator revolving in the mass of substance being tested is measured at least twice in succession after predetermined intervals of time.

With a strictly viscous behavior of the mass being tested, both measurement values are the same, whereas with an elastic component, in consequence of variations in the torque during the measuring time, the second measurement gives a different value for the torque. From the spacing between the two readings, it is possible to detect directly the presence of the elastic component. The record of the torque can also be made dependent on a change in temperature, a continuous addition of a precipitating agent or on other factors.

Figure 1:
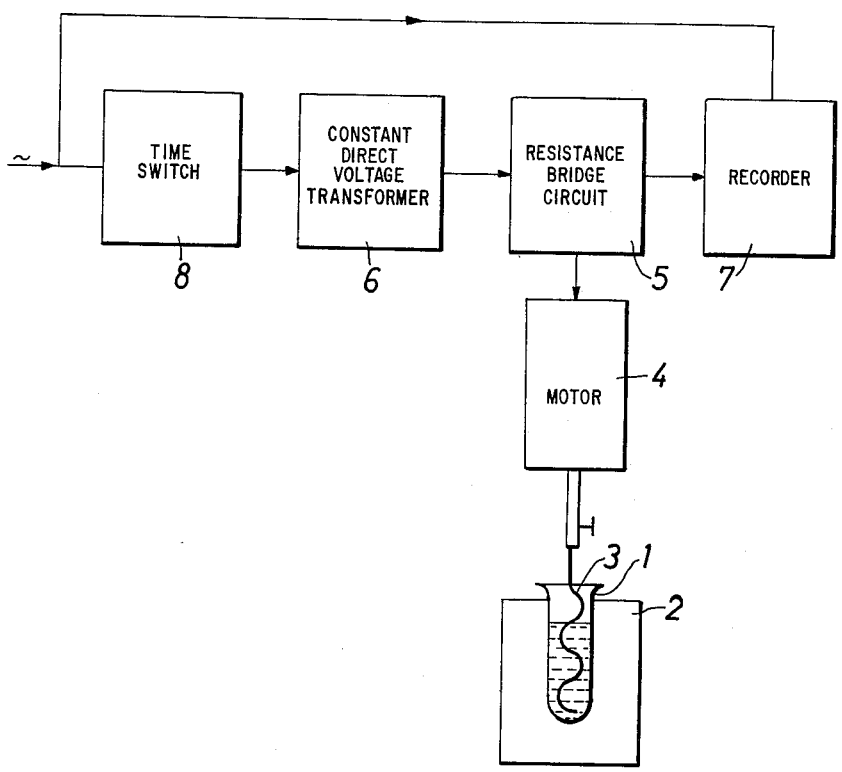

In order that the invention may be more clearly understood a preferred embodiment thereof will now be described by way of example with reference to the accompanying drawing which includes FIG. 1 showing in diagrammatic form, an apparatus for carrying out the process of the invention.

Figure 2:
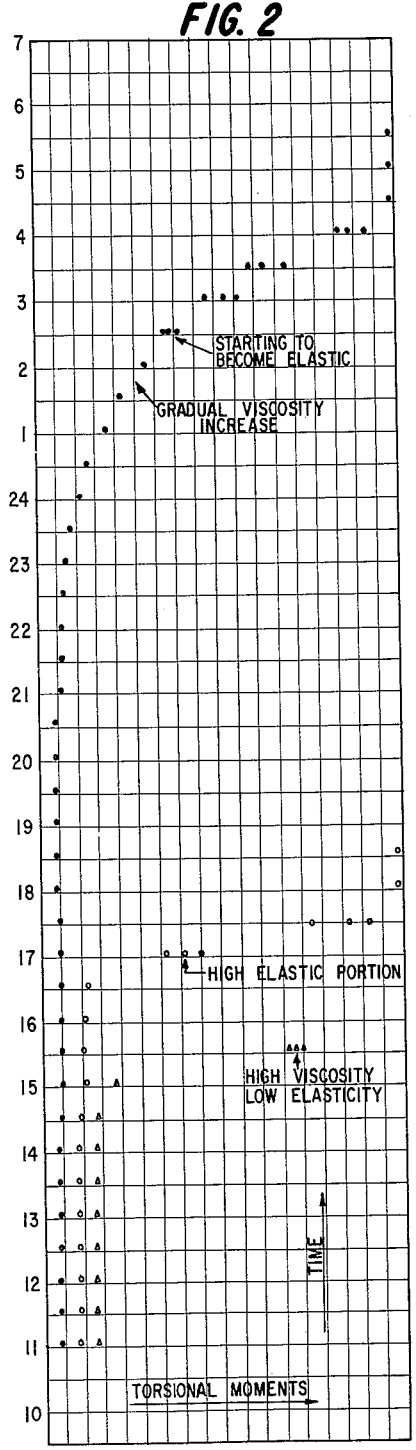
Figure 3:
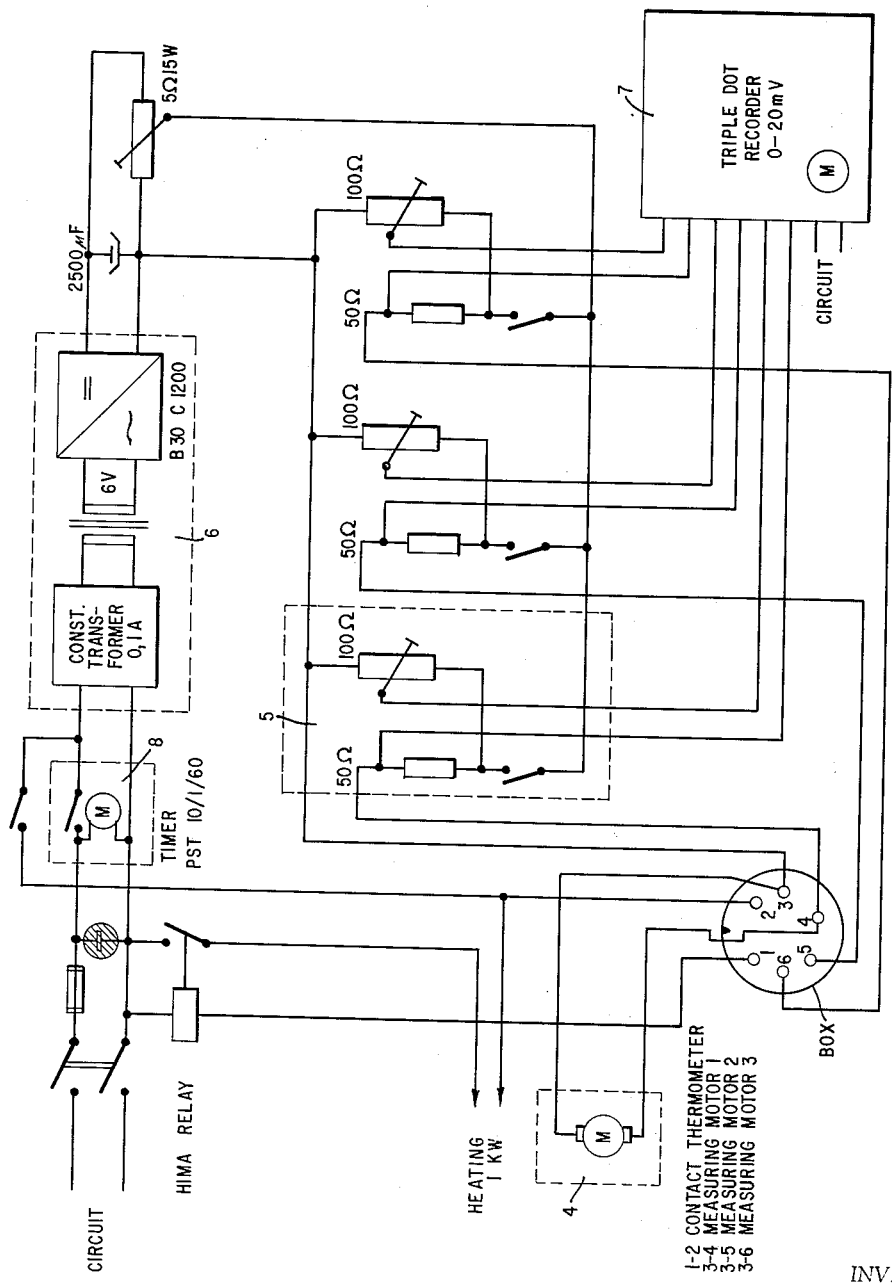

FIG. 2 is a reproduction of a chart recording produced by the process of the invention, the symbols used in the chart, i.e., △, 0 designating different substances being tested and FIG. 3 is a schematic diagram of an apparatus in accordance with the invention as used to obtain the results shown in FIG. 2.

A sample of material to be tested preferably in liquid condition in test-tube 1 is inserted in an electrically heated aluminium block 2, the temperature of which is regulated by a contact thermometer (not shown). An agitator or stirrer 3, consisting of a bent wire, is lowered into the sample. An actuating motor 4, in this case electrical, may be included in any type of load indicating device such as a resistance bridge circuit 5 which is supplied from a power source such as a constant direct voltage transformer 6. The value of this direct voltage, and thus the speed of the motor 4, is constantly adjustable.

The diagonal voltage of the bridge circuit 5 is supplied to a triple recorder 7. The diagonal voltage of the bridge circuit 5 is proportional to the load of the motor 4 and can be adjusted to zero reading on recorder 7 through a potentiometer for any initial loading of the motor. In this way, it is possible to compensate for the initial load or reaction torque when commencing the measurement.

A time switch 8 controls the supply of power to said motor to provide 2 minute periods of power alternating with periods of no power for the rest of every half hour. At the commencement of the measurement, the liquid may show a strictly viscous behaviour, as can be seen from the measurement chart of FIG. 2. Initially during one measurement period, the measurement points of the recorder are located at the same measurement value. The recorder is of a common type which indicates by printing a dot for the momentary value, in this case of the motor load at successive time intervals. On the chart the elapsed time is indicated by the ordinate and load values by the abscissae. In this instance, the recorder makes a dot for three such momentary values and these occur at short intervals during the period that the power is on.

It will readily be understood that the viscosity will change relatively little in the short period that the power is on and so the dots will be practically superimposed. However, as the liquid becomes elastic, as well as viscous, the stirrer 3 begins to flutter in the elastic liquid which is reflected as fluctuations in the motor load. The index of record 7 will flutter correspondingly. Accordingly, the recorded dots will be irregular and no longer superimposed. The wider their spacing, the greater is the indicated elasticity which, however, stops altogether when the stirrer becomes immovably stuck in the solidified mass.

The agitator is then completely embedded in the sample. The test-tube and the inexpensive agitator are discarded after the measurement, this constituting a further advantage of the arrangement.

The chart of FIG. 2 is reproduced from an actual record by this method and apparatus and in that record it will be noted that the three dots recorded at each half hour from 11 o'clock until 15:30 o'clock are superimposed and show substantially no change in viscosity. At 16 and 16:30 o'clock, the material starts to become viscous and the dots which were made at intervals actually of 10 seconds are still superimposed showing substantially no elasticity. At 17 hours, the dots are spread apart showing a high elasticity and incidentally a considerable increase in viscosity. At 17:30 hours, the spread of the dots shows high elasticity coupled with high viscosity. The reading at 18 hours shows the motor stalled and solidification of the mixture being tested.

We claim:
1. In the process for measuring viscosity in which a member is periodically at given time intervals moved through the material under test and the resistance to movement is recorded as a measurement of viscosity, the resistance to said movement being additionally used to determine a change in the elasticity of the material, the improvement comprising effecting at least one additional quickly succeeding measurement of the resistance to movement of the member during each periodic movement, the time of movement of the member being relatively short as compared to the time interval between movements, whereby wide variation of the resistance in said successive measurements indicates elasticity in the material.

2. In the process for simultaneously measuring viscosity and elasticity, in which a member is periodically at given time intervals moved through the material under test and the resistance to movement is recorded as a measurement of viscosity, the resistance to said movement being additionally used to determine a change in the elasticity of the material, the improvement comprising stirring said material, periodically effecting a relatively close succession of measurements of the resistance to stirring of the material, the period of time required for making said close succession of measurements being short as compared to the interval of time between such periods of measurements, whereby wide variation of the resistances in said relatively close succession of measurements indicates elasticity in the material.

3. Apparatus for indicating simultaneously conditions of viscosity and elasticity in a material undergoing changes of such conditions which comprises a stirrer for such material, a motor for actuating said stirrer, a source of power for said motor, and a time switch for controlling the supply of power to said motor to provide periods of power alternating with periods of no power and means to record a plurality of momentary values of the motor load during each such period of power, said periods of power being short as compared to periods of no power.

References Cited in the file of this patent
UNITED STATES PATENTS

| | | |
|---|---|---|
| 2,673,463 | Kimball et al. | Mar. 30, 1954 |
| 2,679,157 | Carpenter | May 25, 1954 |
| 2,929,010 | Lancaster et al. | Mar. 15, 1960 |

OTHER REFERENCES

"An Apparatus for Measuring the Elastic Properties of Gels." An article by Hastewell et al., in the Journal of Scientific Instruments, March 1955, vol. 32, pages 96–99. (Copy available in Div. 36.)

"Basic Problems in the Viscometry of Non-Newtonian Fluids." An article by Merrill in ISA Journal, October 1955, vol. 2, pages 462–465. (Copy available in Div. 36.)